Patented Nov. 26, 1940

2,222,952

UNITED STATES PATENT OFFICE 2,222,952

THEOPHYLLINE AND CAFFEINE SOLUTION

Werner Mothes, Ludwigshafen-on-the-Rhine, Germany, assignor to E. Bilhuber, Inc., Orange, N. J., a corporation of New Jersey No Drawing. Application December 8, 1938, Serial No. 244,613. In Germany January 15, 1938

12 Claims. (Cl. 167—67)

Solutions in water of the purine bases theophylline and caffeine have not been previously employed for purposes of parenteral injection on account of the limited solubility of the above substances in water. The solubility of theophylline in water for example is about 0.5% and that of caffeine about 1.25%. Solutions of salts of the above compounds have been so used but are quite strongly alkaline, which is undesirable for injection purposes.

The present invention accordingly aims primarily to provide solutions suitable for the above purposes and containing the above mentioned purine bases, which may be of adequate concentration, and having a pH within the neutral range as well as certain other characteristics desirable for such purposes.

I have discovered that the solubility of the above mentioned purine bases can be increased many times—in favorable cases up to about ten times, through the use of water soluble salts of the purine-acetic acids as solution promoting agents. The purine-acetic acids are those in which one hydrogen atom is displaced by a purine ring in such a way that the bond occurs at the position of the 1- or 7-nitrogen atom, suitable acids for the purpose being for example, theobromine acetic acid, theophylline acetic acid, 8-brom-1-theobromine acetic acid, which are therefore true chemical compounds.

The alkali or alkaline earth salts of acids of the above character are especially suitable for the purposes of the invention, also the salts of organic bases such as diethylamine, ethylene-diamine, ephedrine, hexamethylenetetramine, methylamino-6-methyl-2-heptene-2 and the like.

By the aid of compounds of the above character, concentrated solutions (i. e. of greater concentration than is obtained with water alone) of theophylline and caffeine may be prepared, which are stable and may be diluted in any proportions without causing precipitation, and which may be sterilized by usual methods. The resulting solutions are suitable for oral administration as well as for parenteral use, and the hydrogen ion concentration of the solutions will lie within the range of pH=about 5.4 to 7. The property which these salts of the purine-acetic acids possess of markedly promoting the solubility of the above mentioned purine bases is quite unpredictable and unexpected. I do not claim herein that the purine bases theobromine and adenine may be rendered desirable for injection purposes by the present invention.

Example 1

Add sufficient water to 1.5 gms. of the calcium salt of theobromine acetic acid, and 0.25 gm. of theophylline, to make the volume 10 cc. Shake at room temperature until a solution results. Sterilize the solution.

Thus a solution containing 2.5% of theophylline is obtained as against a solubility of theophylline in water alone of about 0.5%.

Example 2

Dissolve 3 gms. of the potassium salt of 8-bromtheobromine acetic acid in 8.5 cc. of water. Add 0.4 gm. of theophylline and bring the total volume up to 10 cc. by adding water. Dissolve by shaking at room temperature. Sterilize the solution. Thus 4% of theophylline is gotten into solution.

Example 3

Dissolve 18.95 gms. of the methylamino-6-methyl-2-heptene-2 salt of theobromine acetic acid in 40 cc. of water; in 20 cc. of this solution dissolve 1 gm. of theophylline by shaking at room temperature. Sterilize the solution.

Example 4

Dissolve 5 gms. of the laevo-ephedrine salt of theobromine acetic acid and 1 gm. of theophylline by shaking with sufficient warm water to make the volume 15 cc. Dilute the solution with sufficient water at room temperature to make the total volume 50 cc. Sterilize the solution.

Example 5

Dissolve 5.0 gms. of the sodium salt of theophylline acetic acid and 0.5 gm. of theophylline by shaking with sufficient water at room temperature to make the volume 10 cc. Sterilize the solution. 5% of theophylline is thus brought directly into solution.

Example 6

Dissolve 37.8 gms. of the hexamethylenetetramine salt of theobromine acetic acid in 75 cc. water; to 20 cc. of this solution add 1 gm. of theophylline and dissolve by shaking. Sterilize the solution.

Example 7

Dissolve 27.7 gms. of the ethylenediamine salt of theobromine acetic acid in 50 cc. of water; in 20 cc. of this solution dissolve one gram of theophylline by shaking. Sterilize the solution.

Example 8

Dissolve 31.11 gms. of the diethylamine salt of theobromine acetic acid in 60 cc. of water; to 20 cc. of this solution add 1.5 gms. of caffeine and dissolve by shaking. Sterilize the solution. Thus 7½ caffeine is brought into solution as against a solubility of caffeine in water alone of about 1.25%.

Example 9

Dissolve 27.7 gms. of the ethylenediamine salt of theobromine acetic acid in 50 cc. of water; to 20 cc. of this solution add 1.1 gms. of caffeine and dissolve by shaking. Sterilize the solution.

Example 10

Dissolve 18.95 gms. of the methylamino-6-methyl-2-heptene-2 salt of theobromine acetic acid in 40 cc. of water; to 20 cc. of this solution add 2.5 gms. of caffeine and dissolve by shaking at room temperature; sterilize the solution. Thus 12.5% of caffeine is dissolved.

Example 11

Dissolve 37.8 gms. of the hexamethylenetetramine salt of theobromine acetic acid in 75 cc. of water; take 6.5 cc. of this solution and add 0.2 gms. of theophylline and 0.4 gms. of caffeine, and bring the volume up to 10 cc. by the addition of water; dissolve by shaking. Sterilize the solution.

While the invention has been above disclosed as carried out by certain specific procedures it should be understood that many changes may be made therein without departing from the invention in its broader aspects, within the scope of the appended claims.

I claim:

1. A concentrated, stable, aqueous solution containing at least one of the group of purine bases consisting of theophylline and caffeine in greater than normal concentration, and a water soluble salt of a purine-acetic acid.

2. A concentrated, stable, aqueous solution containing theophylline in greater than normal concentration, and a water soluble purine acetic acid salt of an organic base.

3. A concentrated, stable, aqueous solution containing caffeine in greater than normal concentration and a water soluble purine acetic acid salt of an organic base.

4. The method of dissolving one of the group of purine bases consisting of theophylline and caffeine in water, in greater than normal concentration, which consists in admixing a water soluble salt of a purine acetic acid with such purine base and water.

5. The method of dissolving theophylline in water in greater than normal concentration, which consists in admixing a water soluble purine acetic acid salt of an organic base with theophylline and water.

6. The method of dissolving caffeine in water in greater than normal concentration, which consists in admixing a water soluble purine acetic acid salt of an organic base with caffeine and water.

7. A solution as set forth in claim 1 wherein such salt is an alkali salt.

8. A solution as set forth in claim 1 wherein such salt is an alkaline earth salt.

9. A solution as set forth in claim 1 wherein such salt is a salt of an organic base.

10. A method as set forth in claim 4 wherein such salt is an alkali salt.

11. A method as set forth in claim 4 wherein such salt is an alkaline earth salt.

12. A method as set forth in claim 4 wherein such salt is a salt of an organic base.

WERNER MOTHES.